(12) United States Patent
Chien et al.

(10) Patent No.: US 12,135,495 B2
(45) Date of Patent: Nov. 5, 2024

(54) LIGHT COMBINING STRUCTURE

(71) Applicant: Qisda Corporation, Taoyuan (TW)

(72) Inventors: Chih-Shiung Chien, Taoyuan (TW); Ming-Kuen Lin, Taoyuan (TW); Tsung-Hsun Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 210 days.

(21) Appl. No.: 17/842,895

(22) Filed: Jun. 17, 2022

(65) Prior Publication Data

US 2023/0341756 A1     Oct. 26, 2023

(30) Foreign Application Priority Data

Apr. 20, 2022   (TW) .................................. 111114978

(51) Int. Cl.
*G03B 21/20*     (2006.01)
*H04N 9/31*      (2006.01)

(52) U.S. Cl.
CPC ....... *G03B 21/204* (2013.01); *G03B 21/2066* (2013.01); *H04N 9/3111* (2013.01)

(58) Field of Classification Search
CPC .............. G03B 21/204; G03B 21/2066; G03B 21/2013; H04N 9/3111; H04N 9/3158; H04N 9/3164
See application file for complete search history.

(56) References Cited

U.S. PATENT DOCUMENTS

| | | | |
|---|---|---|---|
| 2022/0390819 A1* | 12/2022 | Chien | G03B 21/204 |
| 2023/0135388 A1* | 5/2023 | Chien | G02B 27/1006 |
| | | | 362/618 |
| 2023/0140583 A1* | 5/2023 | Chien | G03B 21/2066 |
| | | | 353/31 |
| 2023/0296971 A1* | 9/2023 | Gong | G03B 33/12 |
| | | | 353/31 |

FOREIGN PATENT DOCUMENTS

| | | | | |
|---|---|---|---|---|
| CN | 104102082 A | | 10/2014 | |
| DE | 102015218720 A1 | * | 9/2016 | ............. G02B 21/06 |
| TW | 201821894 A | | 6/2018 | |

OTHER PUBLICATIONS

Office action of counterpart application by Taiwan IP Office on Oct. 11, 2022.

* cited by examiner

*Primary Examiner* — Magda Cruz

(57) ABSTRACT

A light combining structure including a first beam splitter, a first light source, a second light source and a second beam splitter is provided. The first light source is disposed on a first side of the first beam splitter to emit a first light and is provided with a first reflection surface. The second light source is disposed on a second side of the first beam splitter to emit a second light and is provided with a second reflection surface. The second beam splitter is disposed on a third side of the first beam splitter, wherein the first beam splitter allows the first light and the second light to partially reflect and partially penetrate, and the first reflection surface, (Continued)

the second reflection surface and the second beam splitter allow the first light and the second light to enter a fourth side of the first beam splitter after being reflected.

20 Claims, 7 Drawing Sheets

LIGHT COMBINING STRUCTURE

This application claims the benefit of Taiwan application Serial No. 111114978, filed Apr. 20, 2022, the disclosure of which is incorporated by reference herein in its entirety.

TECHNICAL FIELD

The disclosure relates in general to a solid-state light source, and more particularly to a light combining structure for enhancing solid-state light source luminance.

BACKGROUND

Solid-state lighting refers to a lighting technology using solid-state light-emitting element, that is, semiconductor component, such as light-emitting diode (LED), organic light-emitting semiconductor and polymer light-emitting diode, as light source. Solid-state lighting possesses the advantages of lower power consumption, longer lifespan, versatile colors, vibration resistance, and strong controllability. In recent years, the solid-state lighting industry, being a power saving industry, has played an important role in energy conservation and carbon reduction and gained rapid advance, and gradually replaces conventional incandescent light bulbs which are power consuming. However, the light intensity of single solid-state light-emitting element is insufficient and is unable to meet the required luminous flux of light source. Therefore, it has become a prominent task for the industries to combine several solid-state light-emitting elements to enhance the light intensity and increase the overall luminance of light source.

SUMMARY

The present invention relates to a light combining structure capable of increasing the overall luminance of light source.

According to one embodiment, a light combining structure including a first beam splitter, a first light source, a second light source and a second beam splitter is provided. The first light source is disposed on a first side of the first beam splitter to emit a first light, the first light source is provided with a first reflection surface. The second light source is disposed on a second side of the first beam splitter to emit a second light, the second light source is provided with a second reflection surface. The second beam splitter is disposed on a third side of the first beam splitter, wherein the first beam splitter allows the first light and the second light to partially reflect and partially penetrate, the first reflection surface, the second reflection surface and the second beam splitter allow the first light and the second light to enter a fourth side of the first beam splitter after being reflected.

The above and other aspects of the invention will become better understood with regard to the following detailed description of the preferred but non-limiting embodiment(s). The following description is made with reference to the accompanying drawings.

DETAILED DESCRIPTION

Technical solutions for the embodiments of the present application are clearly and thoroughly disclosed with accompanying drawings. Obviously, the embodiments disclosed below are only some rather than all of the embodiments of the present invention. All embodiments obtained by anyone ordinarily skilled in the technology field of the present application according to the disclosed embodiments of the present invention are within the scope of protection of the present invention if the obtained embodiments lack innovative labor. Similar/identical designations are used to indicate similar/identical elements.

Figure 1A:
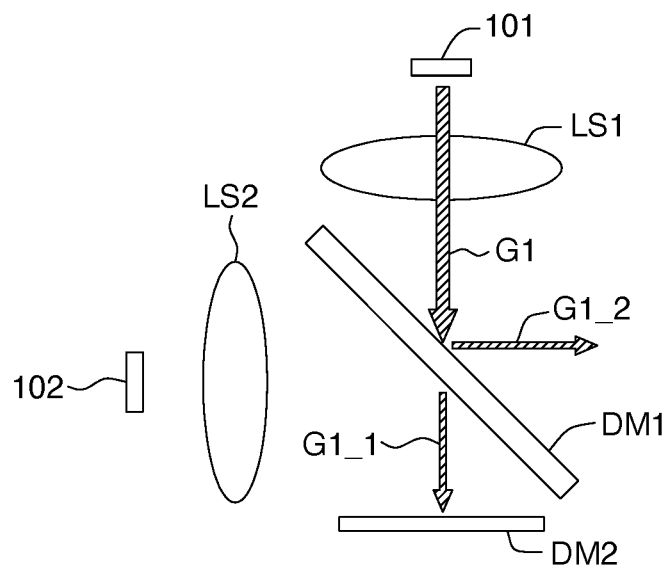
FIGS. 1A-1D respectively are a schematic diagram of an optical path of a light combining structure according to an embodiment of the present invention.

Referring to FIGS. 1A-1D, schematic diagrams of an optical path of a light combining structure 100 according to an embodiment of the present invention are respectively shown. In the diagram, the arrow signs represent the proceeding direction and the intensity (such as nit per unit area) of the light; the larger the arrow sign, the stronger the light intensity; the smaller the arrow sign, the weaker the light intensity. As indicated in FIG. 1A, the first light G1 is split into a first sub-beam G1_1 and a second sub-beam G1_2 by the first beam splitter DM1; the first beam splitter DM1 allows the first sub-beam G1_1 to penetrate but allows the second sub-beam G1_2 to reflect. That is, the first beam splitter DM1 is a part-reflective and part-penetrating beam splitter, which allows the light with specific wavelengths to penetrate and/or to reflect. Let the semi-reflective and semi-penetrating first beam splitter DM1 be taken for example. The light intensity of the first sub-beam G1_1 is about a half of the light intensity of the first light G1, and the light intensity of the second sub-beam G1_2 is about a half of the light intensity of the first light G1.

Figure 1B:
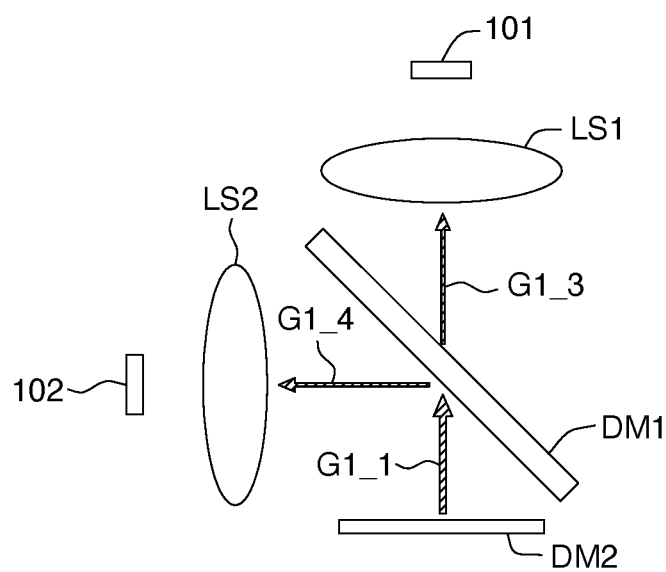

As indicated in FIG. 1B, the first sub-beam G1_1, after penetrating the first beam splitter DM1, is further reflected by the second beam splitter DM2; the first sub-beam G1_1, after being reflected to the first beam splitter DM1, is split into a third sub-beam G1_3 and a fourth sub-beam G1_4 by the first beam splitter DM1; the first beam splitter DM1 allows the third sub-beam G1_3 to penetrate but allows the fourth sub-beam G1_4 to reflect. Let the semi-reflective and semi-penetrating first beam splitter DM1 be taken for example. The light intensity of the third sub-beam G1_3 is about a half of the light intensity of the first sub-beam G1_1, and the light intensity of the fourth sub-beam G1_4 is about a half of the light intensity of the first sub-beam G1_1.

Figure 1C:
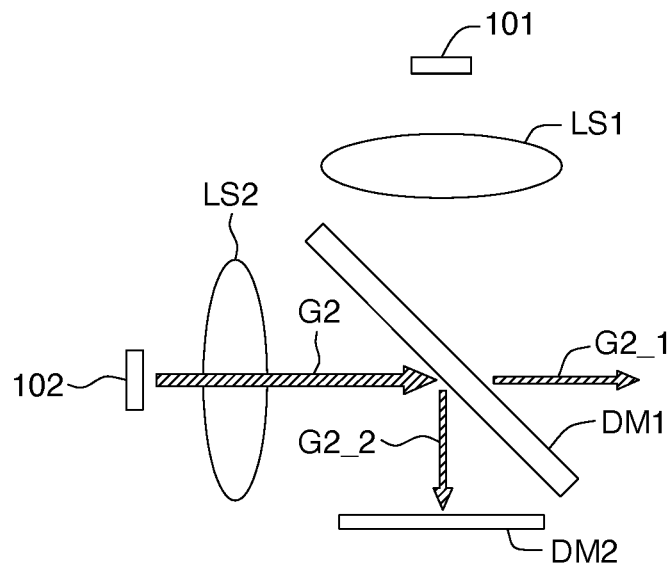

Likewise, as indicated in FIG. 1C, the second light G2 can be split into a first sub-beam G2_1 and a second sub-beam G2_2 by the first beam splitter DM1; the first beam splitter DM1 allows the first sub-beam G2_1 to penetrate but allows the second sub-beam G2_2 to reflect. Let the semi-reflective and semi-penetrating first beam splitter DM1 be taken for example. The light intensity of the first sub-beam G2_1 is about a half of the light intensity of the second light G2, and the light intensity of the second sub-beam G2_2 is about a half of the light intensity of the second light G2.

Figure 1D:
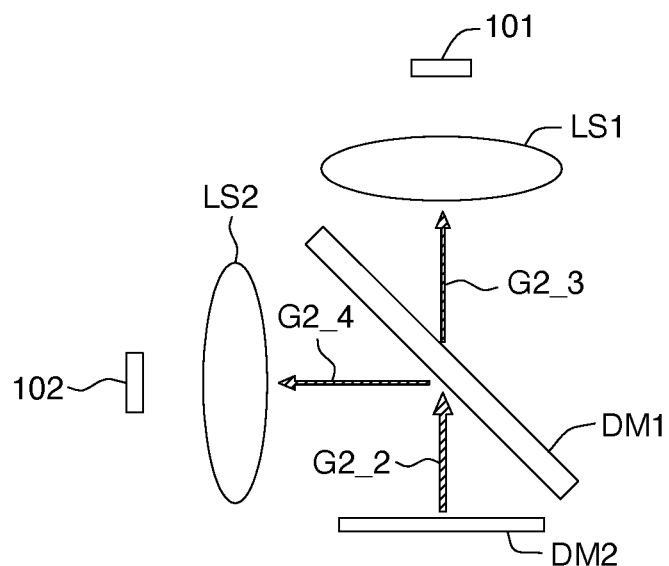

As indicated in FIG. 1D, the second sub-beam G2_2, after being reflected by the first beam splitter DM1, is further reflected by the second beam splitter DM2. Then, the second sub-beam G2_2, after being reflected to the first beam splitter DM1, is split into a third sub-beam G2_3 and a fourth sub-beam G2_4 by the first beam splitter DM1; the first beam splitter DM1 allows the third sub-beam G2_3 to penetrate but allows the fourth sub-beam G2_4 to reflect. Let the semi-reflective and semi-penetrating first beam splitter DM1 be taken for example. The light intensity of the third sub-beam G2_3 is about a half of the light intensity of the second sub-beam G2_2, and the light intensity of the fourth sub-beam G2_4 is about a half of the light intensity of the second sub-beam G2_2.

Under the circumstances that no light loss occur, the third sub-beam G1_3 and the fourth sub-beam G1_4 of the first light G1 as well as the third sub-beam G2_3 and the fourth sub-beam G2_4 of the second light G2 can be further split into more sub-beams by the first beam splitter DM1 and the second beam splitter DM2 respectively to increase the overall brightness of the system light source. Through the light sources on two adjacent sides, the light combining structure 100 allows the first light G1 and the second light G2 to partially reflect and partially penetrate, hence resolving the problem that the light intensity of single light source is insufficient and is unable to meet the required luminous flux of the system light source. The light combining structure 100 can be used as a system light source in a projector.

Figure 2A:
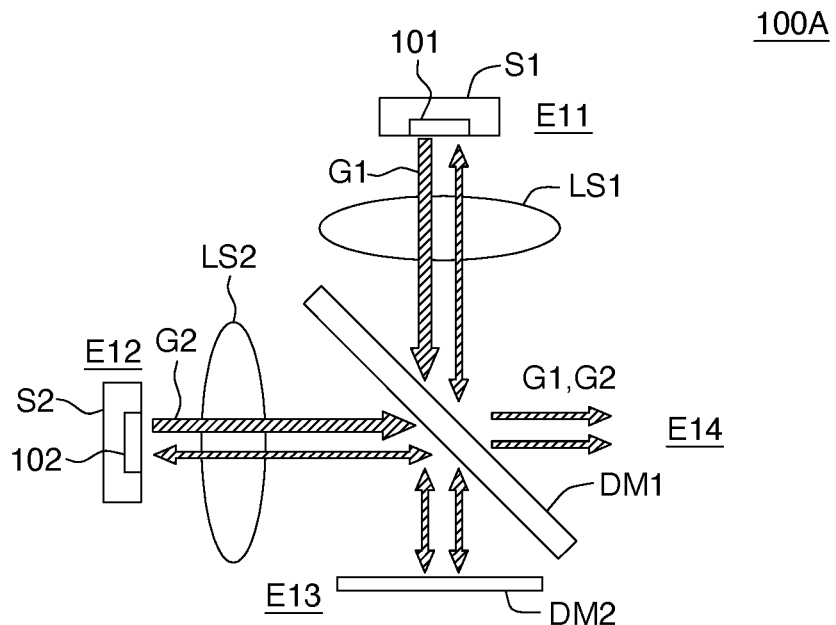
FIGS. 2A and 2B respectively are a schematic diagram of a light combining structure according to an embodiment of the present invention.
Figure 2B:
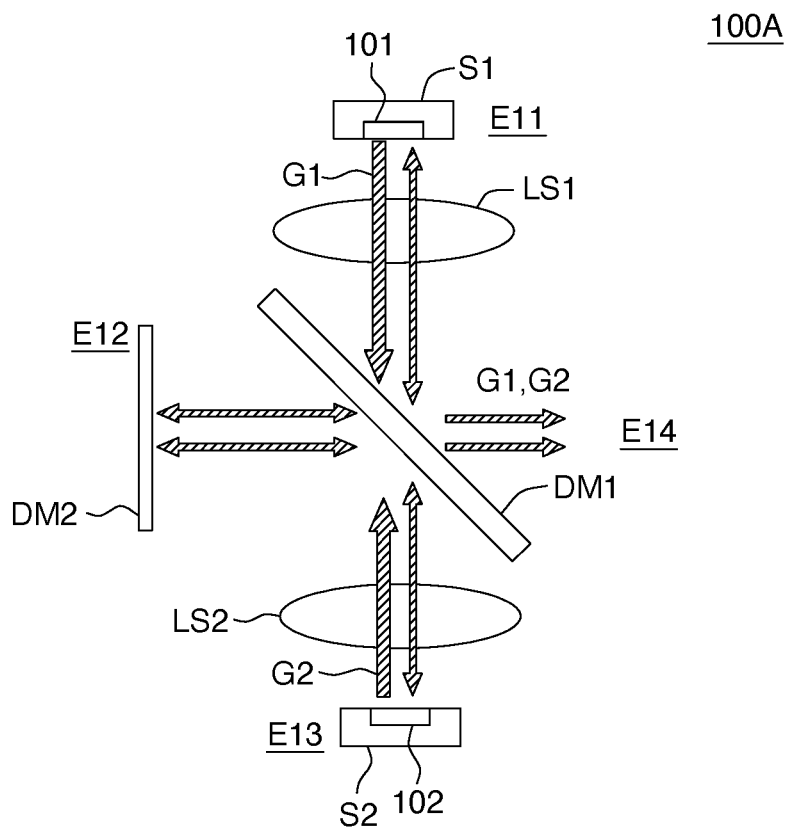

Referring to FIGS. 2A and 2B, schematic diagrams of a light combining structure 100A according to an embodiment of the present invention are respectively shown. The light combining structure 100A includes a first beam splitter DM1, a first light source 101, a second light source 102 and a second beam splitter DM2. The first light source 101 is disposed on a first side E11 of the first beam splitter DM1 to emit a first light G1, and is provided with a first reflection surface S1. The second light source 102 is disposed on a second side E12 of the first beam splitter DM1 to emit a second light G2, and is provided with a second reflection surface S2. That is, the first light source 101 and the second light source 102 respectively are disposed on the first side E11 and the second side E12 which are adjacent to each other (referring to FIG. 2A) or disposed on the first side E11 and the third side E13 which are opposite to each other (referring to FIG. 2B). The first beam splitter DM1 allows the first light G1 and the second light G2 to partially reflect and partially penetrate, as described in detail in FIGS. 1A-1D, and are not repeated here.

Besides, the light-emitting sides of the first light source 101 and the second light source 102 respectively are provided with collimators LS1 and LS2 configured to converge or collect the first light G1 and the second light G2 on the optical path of the center of each light source to increase the light intensity at the center of each light source.

In the present embodiment, the first light source 101 and the second light source 102 can be realized by solid-state light sources such as light-emitting diodes (LEDs). The rear of the first light source 101 or a side of the first light source 101 near the rear is provided with a reflective sheet, a reflective layer and/or a light guide structure. The rear of the second light source 102 or a side of the second light source 102 near the rear is provided with a reflective sheet, a reflective layer and/or a light guide structure. The surface of the reflective sheet has a coating configured to reflect the light. For example, the third sub-beam G1_3 and the fourth sub-beam G1_4 of FIG. 1B can proceed to the first light source 101 and the second light source 102 respectively, and can further be reflected to the first beam splitter DM1 from the first reflection surface S1 of the first light source 101 and the second reflection surface S2 of the second light source 102 respectively. Likewise, the third sub-beam G1_3 and the fourth sub-beam G1_4 of FIG. 1D can proceed to the first light source 101 and the second light source 102 respectively, and can further be reflected to the first beam splitter DM1 from the first reflection surface S1 of the first light source 101 and the second reflection surface S2 of the second light source 102.

The first reflection surface S1, the second reflection surface S2 and the second beam splitter DM2 have similar use, that is, they allow the first light G1, the second light G2 and the sub-beams of the first light G1 and the second light G2 to enter a fourth side E14 of the first beam splitter DM1 after being reflected at least once. The second beam splitter DM2 is disposed on a third side E13 of the first beam splitter DM1, wherein the first side E11 and the third side E13 are opposite to each other; the second side E12 and the fourth side E14 are opposite to each other. In an embodiment, the first reflection surface S1 is substantially disposed on an extension line in the light-emitting direction of the first light G1; the second reflection surface S2 is substantially disposed on an extension line in the light-emitting direction of the second light G2.

The color of the first light G1 and the second light G2 can be green or other color. The first light source 101 and the second light source 102 can be green light LEDs or LEDs which generate green light when excited by a blue light and an ultraviolet light. In the present embodiment, two LED light sources emitting identical color light are arranged, not only resolving the problem that the light intensity of single light source is insufficient and is unable to meet the required luminous flux of the system light source, but also increasing the luminance of single color light of the system light source. In another embodiment, the first light G1 and the second light G2 can have different colors. For example, the first light G1 is a green light and the second light G2 is a blue light or a red light. In other embodiments (referring to FIG. 6), the first light G1 and the second light G2 whose colors are different can form a color light required by the system light source with the third light B1 and the fourth light B4 whose colors are different. The light combining structure 100A can be used as a system light source in a projector.

Figure 3:
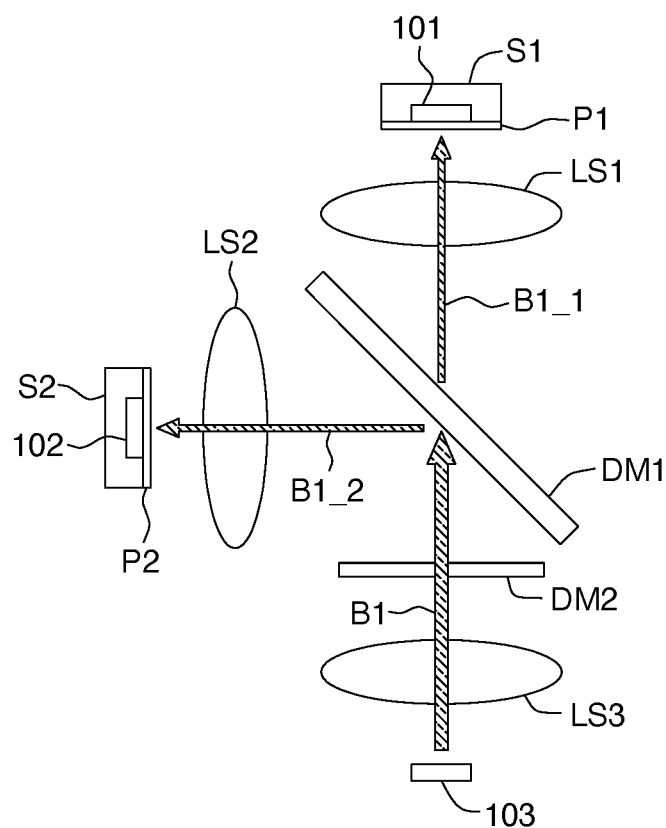
FIG. 3 is a schematic diagram of a light combining structure according to another embodiment of the present invention.

Referring to FIG. 3, a schematic diagram of a light combining structure 100B according to another embodiment of the present invention is shown. In the present embodiment, in addition to the first light source 101 and the second light source 102, the light combining structure 100B further includes a third light source 103 disposed on a side of the second beam splitter DM2 to emit a third light B1. The color of the third light B1 is different from that of the first light G1 and the second light G2. For example, the third light B1 is a blue light, an ultraviolet light or other color light. The third light source 103 is mainly used as a light source for exciting phosphor.

As indicated in FIG. 3, the first beam splitter DM1 allows the third light B1 to partially reflect and partially penetrate; the second beam splitter DM2 allows the third light B1 to penetrate. That is, the third light B1 is split into a first sub-beam B1_1 and a second sub-beam B1_2 by the first beam splitter DM1. The first beam splitter DM1 allows the first sub-beam B1_1 to penetrate and to proceed towards the first light source 101 but allows the second sub-beam B1_2 to reflect and to proceed towards the second light source 102.

Besides, the first light source 101 and the second light source 102 are respectively provided with phosphors P1 and P2, such as green phosphors or phosphors of other color. The phosphors P1 and P2 can be excited by the third light B1 to generate a fourth light whose color can be the same with that of the first light G1 and the second light G2. For example, the green phosphor is excited by a blue light and an ultraviolet light to generate a green light having the same color with the first light G1 and the second light G2. In the present embodiment, the third light source 103 is arranged to generate more color lights to increase the luminance of single color light of the system light source. The light combining structure 100B can be used as a system light source in a projector.

Figure 4:
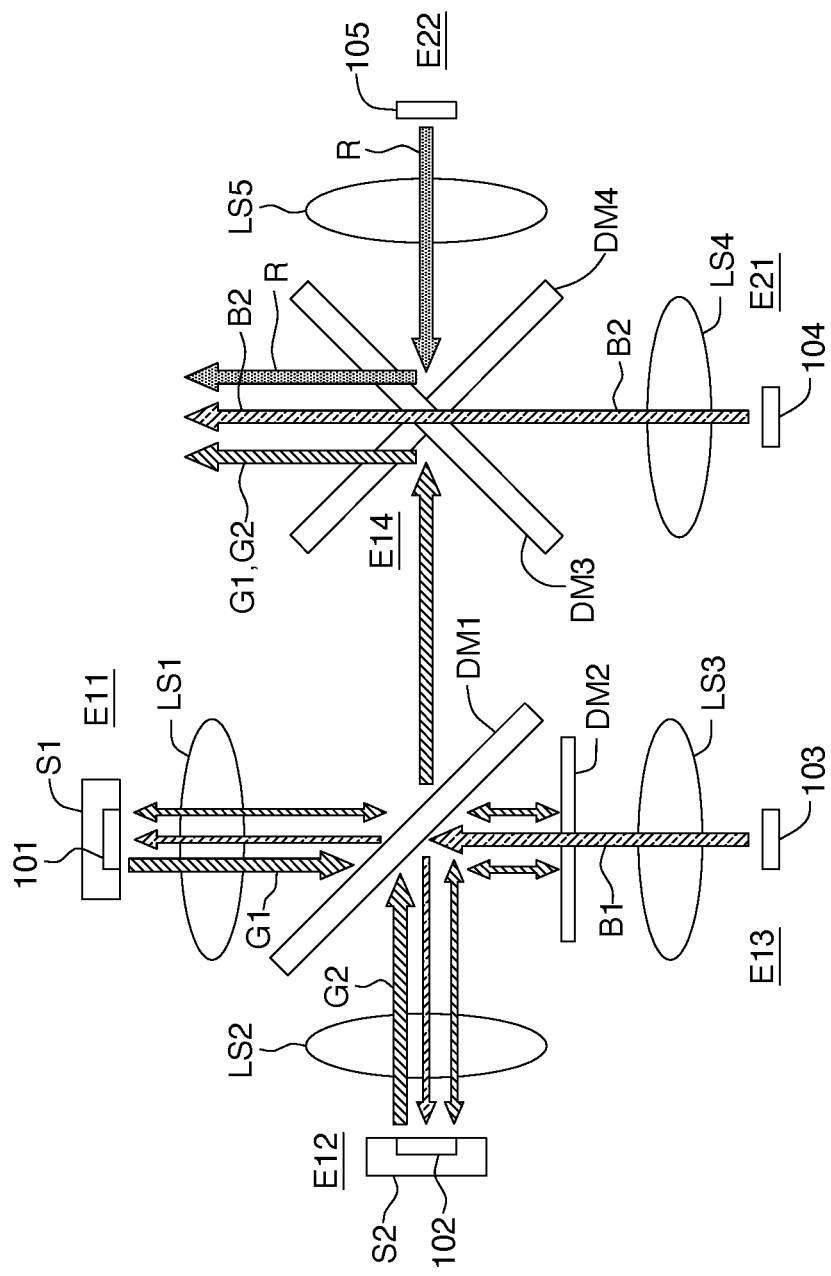
FIG. 4 is a schematic diagram of a light combining structure according to another embodiment of the present invention.

Referring to FIG. 4, a schematic diagram of a light combining structure 100C according to another embodiment of the present invention is shown. In the present embodiment, in addition to the first light source 101, the second light source 102 and the selectively disposed third light source 103, the light combining structure 100C further includes a third beam splitter DM3, a fourth beam splitter DM4, a fourth light source 104 and a fifth light source 105. The third beam splitter DM3 and the fourth beam splitter DM4 both are disposed on the fourth side E14 of the first beam splitter DM1. The fourth beam splitter DM4 substantially is disposed in parallel with the first beam splitter DM1 in the same direction; the third beam splitter DM3 and the fourth beam splitter DM4 substantially are disposed in different directions (such as in a cross arrangement). As indicated in FIG. 4, the third beam splitter DM3 allows the first light G1 of the first light source 101 and the second light G2 of the second light source 102 to reflect, but the fourth beam splitter DM4 allows the first light G1 of the first light source 101 and the second light G2 of the second light source 102 to penetrate.

Besides, the fourth light source 104 is disposed on a first side E21 of the fourth beam splitter DM4 to emit a fourth light B2. The fifth light source 105 is disposed on a second side E22 of the fourth beam splitter DM4 to emit a fifth light R. The third beam splitter DM3 allows the fourth light B2 and the fifth light R to penetrate. The fourth beam splitter DM4 allows the fourth light B2 to penetrate but allows the fifth light R to reflect. The light-emitting sides of the third light source 103, the fourth light source 104 and the fifth light source 105 respectively are provided with collimators LS3, LS4 and LS5.

The first light G1 and the second light G2 have the same color, such as green. The third light B1 and the fourth light B2 have the same color, such as blue. The color of the fifth light R is different from that of the first light G1 to the fourth light B2. For example, the fifth light R is a red light.

As indicated in FIG. 4, the first light G1 and the second light G2, after being reflected by the third beam splitter DM3, become a part of the color light required by the system light source; the fourth light B2, after penetrating the third beam splitter DM3 and the fourth beam splitter DM4, becomes a part of the color light required by the system light source; the fifth light R, after being reflected by the fourth beam splitter DM4, becomes a part of the color light required by the system light source. Thus, the lights of three different colors (G1, G2, B2, R) can be combined by the light combining structure 100C of the present embodiment to form a color light required by the system light source. The light combining structure 100C can be used as a system light source in a projector.

Figure 5:
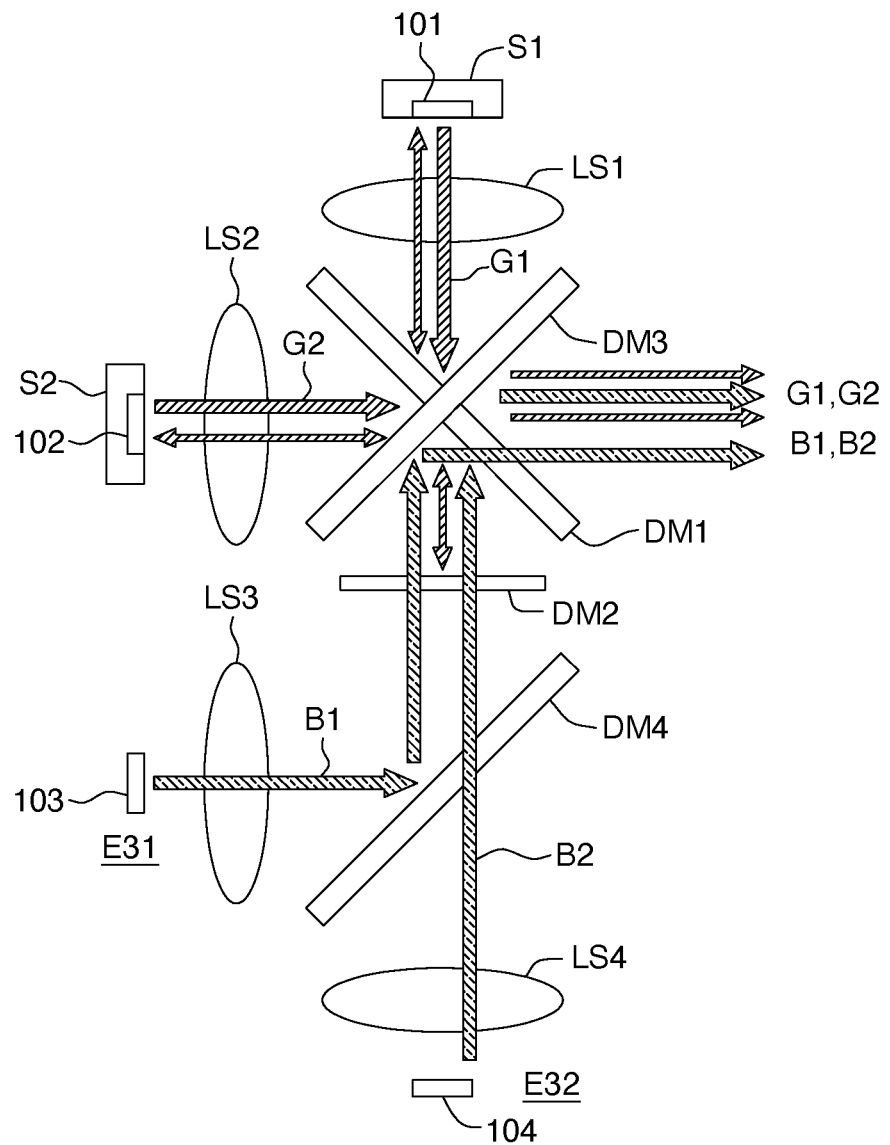
FIG. 5 is a schematic diagram of a light combining structure according to another embodiment of the present invention.

Referring to FIG. 5, a schematic diagram of a light combining structure 100D according to another embodiment of the present invention is shown. In the present embodiment, in addition to the first light source 101, the second light source 102 and the third light source 103, the light combining structure 100D further includes a third beam splitter DM3, a fourth beam splitter DM4 and a fourth light source 104. The third beam splitter DM3 is disposed on a side of the second beam splitter DM2; the fourth beam splitter DM4 is disposed on another side of the second beam splitter DM2. The third beam splitter DM3 substantially is disposed in parallel with the fourth beam splitter DM4 in the same direction; the third beam splitter DM3 and the first beam splitter DM1 substantially are disposed in different directions (such as in a cross arrangement). As indicated in FIG. 5, the third beam splitter DM3 allows the first light G1 of the first light source 101 and the second light G2 of the second light source 102 to penetrate.

Besides, the third light source 103 is disposed on a first side E31 of the fourth beam splitter DM4 to emit a third light B1; the fourth light source 104 is disposed on a second side E32 of the fourth beam splitter DM4 to emit a fourth light B2. The third beam splitter DM3 allows the third light B1 and the fourth light B2 to enter the fourth side E14 of the first beam splitter DM1 after being reflected; the fourth beam splitter DM4 allows the third light B1 to reflect, but the fourth beam splitter DM4 allows the fourth light B2 to penetrate.

The first light G1 and the second light G2 have the same color, such as green light. The third light B1 and the fourth light B2 have different colors, such as blue and red; the color of the third light B1 is different from that of the first light G1 and the second light G2; the color of the fourth light B2 is different from that of the first light G1 and the second light G2.

As indicated in FIG. 5, the first light G1 and the second light G2, after penetrating the third beam splitter DM3, become a part of the color light required by the system light source. The third light B1, after being reflected by the fourth beam splitter DM4, penetrates the second beam splitter DM2 to reach the third beam splitter DM3, then is further reflected by the third beam splitter DM3 to become a part of the color light required by the system light source. Besides, the fourth light B2, after penetrating the fourth beam splitter DM4 and the second beam splitter DM2, is further reflected to the third beam splitter DM3 to become a part of the color light required by the system light source. Thus, the lights of three different colors (G1, G2, B1, B2) can be combined by the light combining structure 100D of the present embodiment to form a color light required by the system light source. The light combining structure 100D can be used as a system light source in a projector.

Figure 6:
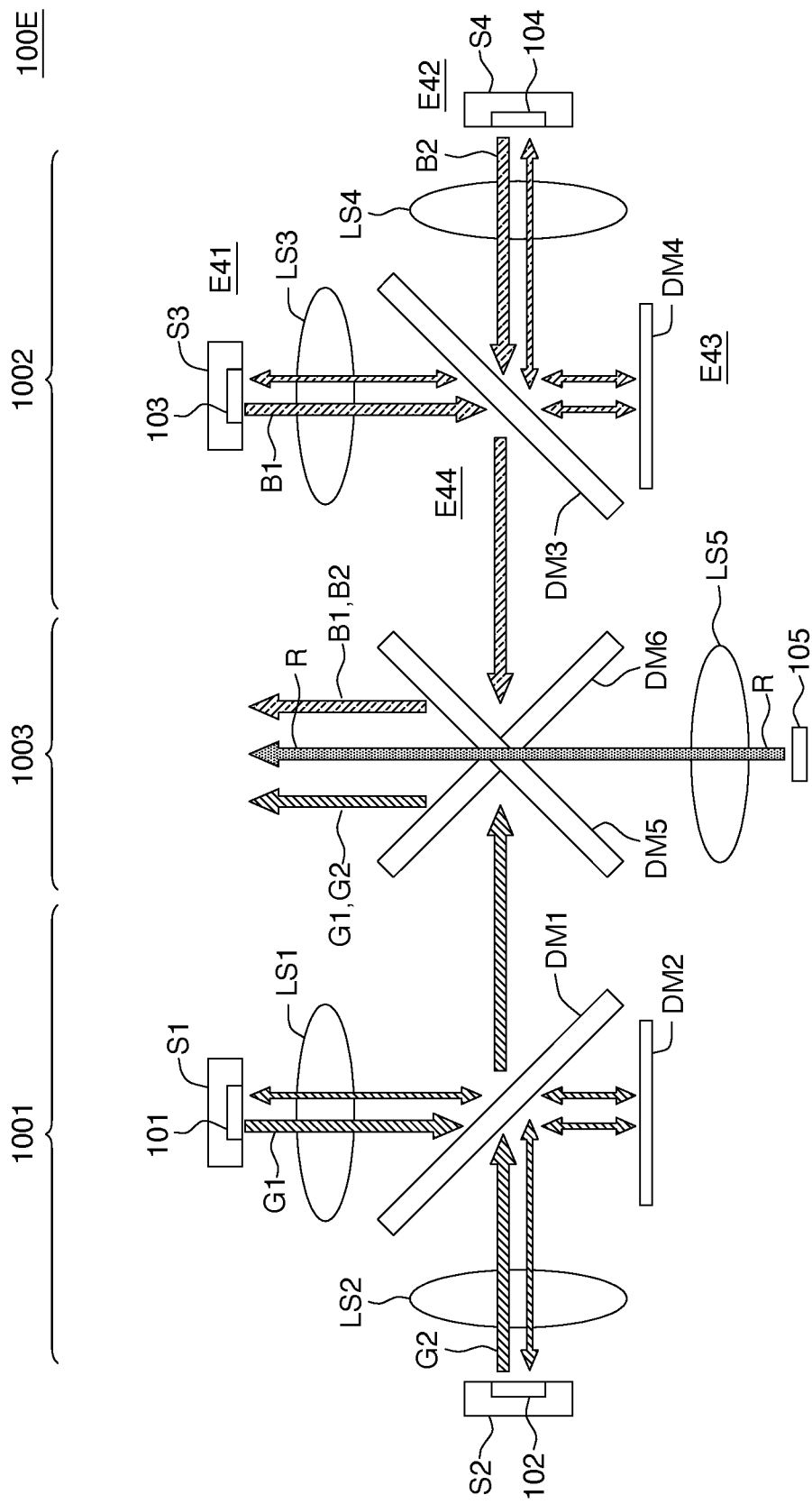
FIG. 6 is a schematic diagram of a light combining structure according to another embodiment of the present invention.

Referring to FIG. 6, a schematic diagram of a light combining structure 100E according to another embodiment of the present invention is shown. In the present embodiment, the light combining structure 100E includes a first light combining structure 1001, a second light combining structure 1002 and a light-emitting structure 1003 located between the first light combining structure 1001 and the second light combining structure 1002. The light-emitting structure 1003 includes a fifth beam splitter DM5 and a sixth beam splitter DM6. The first light combining structure 1001 and the second light combining structure 1002 basically have the same elements and are disposed according to a mirroring or symmetric arrangement. The first light combining structure 1001 includes a first light source 101, a second light source 102, a first beam splitter DM1 and a second beam splitter DM2. Detailed descriptions of arrangement can be obtained with reference to FIG. 2, and are not repeated here. The second light combining structure 1002 includes a third light source 103, a fourth light source 104, a third beam splitter DM3 and a fourth beam splitter DM4. The third light source 103 is disposed on a first side E41 of the third beam splitter DM3 to emit a third light B1, and is provided with a third reflection surface S3. The fourth light source 104 is disposed on a second side E42 of the third beam splitter DM3 to emit a fourth light B2, and is provided with a fourth reflection surface S4. That is, the third light source 103 and the fourth light source 104 respectively are disposed on the first side E41 and the second side E42 which are adjacent to each other (or disposed on the first side E41 and the third side E43 which are opposite to each other). The third beam splitter DM3 allows the third light B1 and the fourth light B2 to partially reflect and partially penetrate, and the descriptions are similar to the first beam splitter DM1 of FIGS. 1A-1D. The third beam splitter DM3 and the first beam splitter DM1 are disposed according to a mirroring arrangement, and detailed descriptions are not repeated here. In other embodiments, the first light source 101 and the third light source 103 have different color lights and their positions can be swapped, and the second light source 102 and the fourth light source 104 have different color lights and their positions can be swapped. Or, the first light source 101, the second light source 102 and the third light source 103 have identical color light, and the fourth light source 104 has other color light, such that the generated color light can have triple luminance, and the luminance of single color light of the system light source can be increased.

The third reflection surface S3, the fourth reflection surface S4 and the fourth beam splitter DM4 have similar use, that is, they allow the third light B1, the fourth light B2 and the sub-beams of the third light B1 and the fourth light B2 to enter a fourth side E44 the third beam splitter DM3 after being reflected at least once. The fourth beam splitter DM4 is disposed on a third side E43 of the third beam splitter DM3, wherein the first side E41 and the third side E43 are opposite to each other; the second side E42 and the fourth side E44 are opposite to each other. In an embodiment, the third reflection surface S3 is substantially disposed on an extension line in the light-emitting direction of the third light B1, and the fourth reflection surface S4 is substantially disposed on an extension line in the light-emitting direction of the fourth light B2.

The first light G1 and the second light G2 can be green light or other color light; the third light B1 and the fourth light B2 can be red light or other color light. That is, the color of the third light B1 is different from that of the first light G1 and the second light G2, and the color of the fourth light B2 is different from that of the first light G1 and the second light G2. In the present embodiment, two light combining structures 1001 and 1002 are arranged. Each of the light combining structures 1001 and 1002 includes two LED light sources having identical color light, not only resolving the problem that the light intensity of single light source is insufficient and is unable to meet the required luminous flux of the system light source, but also increasing the luminance of two different color lights of the system light source.

Referring to FIG. 6, the fifth beam splitter DM5 and the sixth beam splitter DM6 both are disposed between the first beam splitter DM1 and the third beam splitter DM3, the fifth beam splitter DM5 substantially is disposed in parallel with the third beam splitter DM3 in the same direction, and the sixth beam splitter DM6 substantially is disposed in parallel with the first beam splitter DM1 in the same direction. The fifth beam splitter DM5 and the sixth beam splitter DM6 are disposed in different directions (such as in a cross arrangement).

Besides, the fifth beam splitter DM5 allows the first light G1 and the second light G2 to reflect, the sixth beam splitter DM6 allows the first light G1 and the second light G2 to penetrate, the fifth beam splitter DM5 allows the third light B1 and the fourth light B2 to penetrate, the sixth beam splitter DM6 allows the third light B1 and the fourth light B2 to reflect, and the fifth beam splitter DM5 and the sixth beam splitter DM6 allow the fifth light R to penetrate. Thus, the first light G1 and the second light G2, after being reflected by the fifth beam splitter DM5, becomes a part of the color light required by the system light source, and the third light B1 and the fourth light B2, after being reflected by the sixth beam splitter DM6, become a part of the color light required by the system light source.

The light combining structure 100E of FIG. 6 further includes a fifth light source 105 disposed on a side of the fifth beam splitter DM5 and the sixth beam splitter DM6 to emit a fifth light R, such as blue light or other color light, wherein the color of the fifth light R can be different from that of the first light G1 to the fourth light B2. The fifth beam splitter DM5 and the sixth beam splitter DM6 allow the fifth light R to penetrate, so that the fifth light R becomes a part of the color light required by the system light source. Thus, the lights of three different colors (G1, G2, B1, B2, R) can be combined by the light combining structure 100E of the present embodiment to form a color light required by the system light source. The light combining structure 100E can be used as a system light source in a projector.

The light combining structure disclosed in above embodiments of the present invention can be used in a projector or an image outputting device, which requires a high luminance, to increase the overall luminance of the system light source to resolve that problem that the light intensity of single solid-state light-emitting element is insufficient and is unable to meet the required luminous flux of light source.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A light combining structure, comprising:
a first beam splitter;
a first light source disposed on a first side of the first beam splitter to emit a first light, wherein the first light source is provided with a first reflection surface;
a second light source disposed on a second side of the first beam splitter to emit a second light, wherein the second light source is provided with a second reflection surface; and
a second beam splitter disposed on a third side of the first beam splitter, wherein the first beam splitter allows the first light and the second light to partially reflect and partially penetrate, wherein the first reflection surface, the second reflection surface and the second beam splitter allow the first light and the second light to enter a fourth side of the first beam splitter after being reflected.

2. The light combining structure according to claim 1, wherein the first side and the third side are opposite to each other, and the second side and the fourth side are opposite to each other.

3. The light combining structure according to claim 1, further comprising a third light source disposed on a side of the second beam splitter to emit a third light, wherein the first beam splitter allows the third light to partially reflect and partially penetrate, and the second beam splitter allows the third light to penetrate.

4. The light combining structure according to claim 3, wherein the first light and the second light have a same color, and a color of the third light is different from the color of the first light and the second light.

5. The light combining structure according to claim 4, wherein the first light source and the second light source are respectively provided with a phosphor, when excited by the third light, the phosphor generates a color light whose color is the same with the color of the first light and the second light.

6. The light combining structure according to claim 3, further comprising:
a third beam splitter disposed on the fourth side of the first beam splitter;
a fourth beam splitter disposed on the fourth side of the first beam splitter;
a fourth light source disposed on a first side of the fourth beam splitter to emit a fourth light; and
a fifth light source disposed on a second side of the fourth beam splitter to emit a fifth light,
wherein the third beam splitter allows the first light and the second light to reflect, the fourth beam splitter allows the first light and the second light to penetrate, the third beam splitter allows the fourth light to penetrate, the third beam splitter allows the fifth light to penetrate, the fourth beam splitter allows the fourth light to penetrate, and the fourth beam splitter allows the fifth light to reflect.

7. The light combining structure according to claim 6, wherein the first light and the second light have a same color, the third light and the fourth light have a same color, and a color of the fifth light is different from the colors of the first light to the fourth light.

8. The light combining structure according to claim 1, further comprising:
a third beam splitter disposed on a side of the second beam splitter;
a fourth beam splitter disposed on another side of the second beam splitter;
a third light source disposed on a first side of the fourth beam splitter to emit a third light; and
a fourth light source disposed on a second side of the fourth beam splitter to emit a fourth light,
wherein the third beam splitter allows the third light and the fourth light to enter the fourth side of the first beam splitter after being reflected, the third beam splitter allows the first light and the second light to penetrate, the fourth beam splitter allows the third light to reflect, and the fourth beam splitter allows the fourth light to penetrate.

9. The light combining structure according to claim 8, wherein the first light and the second light have a same color, and a color of the third light and the fourth light is different from the color of the first light and the second light.

10. The light combining structure according to claim 1, further comprising:
a third beam splitter;
a third light source disposed on a first side of the third beam splitter to emit a third light, wherein the third light source is provided with a third reflection surface;
a fourth light source disposed on a second side of the third beam splitter to emit a fourth light, wherein the fourth light source is provided with a fourth reflection surface; and
a fourth beam splitter disposed on a third side of the third beam splitter, wherein the third beam splitter allows the third light and the fourth light to partially reflect and partially penetrate, the third reflection surface, the fourth reflection surface and the fourth beam splitter allow the third light and the fourth light to enter a fourth side of the third beam splitter after being reflected, the first side and the third side are opposite to each other, the second side and the fourth side are opposite to each other, and the third beam splitter and the first beam splitter are disposed according to a mirroring arrangement.

11. The light combining structure according to claim 10, wherein the first light and the second light have a same color; the third light and the fourth light have a same color, and the color of the third light and the fourth light is different from the color of the first light and the second light.

12. The light combining structure according to claim 10, further comprising:
a fifth beam splitter disposed between the first beam splitter and the third beam splitter;
a sixth beam splitter disposed between the first beam splitter and the third beam splitter; and
a fifth light source disposed on a side of the fifth beam splitter and the sixth beam splitter to emit a fifth light,
wherein the fifth beam splitter allows the first light and the second light to reflect, the sixth beam splitter allows the first light and the second light to penetrate, the fifth beam splitter allows the third light and the fourth light to penetrate, the sixth beam splitter allows the third light and the fourth light to reflect, and the fifth beam splitter and the sixth beam splitter allow the fifth light to penetrate.

13. The light combining structure according to claim 12, wherein the first light and the second light have a same color, the third light and the fourth light have a same color, and a color of the fifth light is different from the colors of the first light to the fourth light.

14. The light combining structure according to claim 10, wherein a part of the third light, after penetrating the third beam splitter, is further allowed to reflect and to penetrate by the fourth beam splitter, the third beam splitter, the third reflection surface and the fourth reflection surface and then reaches the fourth side of the third beam splitter.

15. The light combining structure according to claim 10, wherein a part of the fourth light, after being reflected by the third beam splitter, is further allowed to reflect and to penetrate by the fourth beam splitter, the third beam splitter, the third reflection surface and the fourth reflection surface and then reaches the fourth side of the third beam splitter.

16. The light combining structure according to claim 1, wherein a part of the first light, after penetrating the first beam splitter, is further allowed to reflect and to penetrate by the second beam splitter, the first beam splitter, the first reflection surface and the second reflection surface and then reaches the fourth side of the first beam splitter.

17. The light combining structure according to claim 1, wherein a part of the second light, after being reflected by the first beam splitter, is further allowed to reflect and to penetrate by the second beam splitter, the first beam splitter, the first reflection surface and the second reflection surface and then reaches the fourth side of the first beam splitter.

18. A light combining structure, comprising:
a first beam splitter;
a first light source disposed on a first side of the first beam splitter to emit a first light, wherein the first light source is provided with a first reflection surface;
a second light source disposed on a second side of the first beam splitter to emit a second light, wherein the second light source is provided with a second reflection surface; and
a second beam splitter disposed on a third side of the first beam splitter, wherein the first beam splitter allows the first light and the second light to partially reflect and partially penetrate, wherein the first reflection surface, the second reflection surface and the second beam splitter allow the first light and the second light to enter a fourth side of the first beam splitter after being reflected,
wherein, the first light source and the second light source are respectively provided with a phosphor, when the phosphor is excited by a third light, the phosphor generates a fourth light.

19. The light combining structure according to claim 18, wherein a color of the fourth light is as same as a color of the first light and the second light.

20. The light combining structure according to claim 18, wherein a color of the third light is different from a color of the first light and the second light.

* * * * *